US008191130B2

(12) United States Patent
Uchikawa

(10) Patent No.: US 8,191,130 B2
(45) Date of Patent: May 29, 2012

(54) PRINTING APPARATUS AND INFORMATION PROCESSING APPARATUS

(75) Inventor: Shinichi Uchikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 11/813,984

(22) PCT Filed: Feb. 17, 2006

(86) PCT No.: PCT/JP2006/303353
§ 371 (c)(1),
(2), (4) Date: Jul. 13, 2007

(87) PCT Pub. No.: WO2006/093031
PCT Pub. Date: Sep. 8, 2006

(65) Prior Publication Data
US 2008/0289024 A1    Nov. 20, 2008

(30) Foreign Application Priority Data

Mar. 2, 2005  (JP) ................................. 2005-057934

(51) Int. Cl.
*H04L 29/06* (2006.01)
(52) U.S. Cl. ........................................................ 726/10
(58) Field of Classification Search ...................... 726/10
See application file for complete search history.

(56) References Cited

U.S. PATENT DOCUMENTS

| | | | | |
|---|---|---|---|---|
| 6,092,196 A * | 7/2000 | Reiche | ............................... | 726/6 |
| 2002/0042884 A1* | 4/2002 | Wu et al. | ........................ | 713/201 |
| 2002/0105666 A1* | 8/2002 | Sesek | ............................ | 358/1.14 |
| 2003/0046535 A1* | 3/2003 | Nelson | ............................ | 713/155 |
| 2003/0079134 A1* | 4/2003 | Manchala et al. | ............. | 713/182 |
| 2003/0115511 A1* | 6/2003 | Kubota | ............................... | 714/47 |
| 2004/0021890 A1* | 2/2004 | Hirai et al. | ..................... | 358/1.13 |
| 2005/0073707 A1 | 4/2005 | Yamazoe | ........................ | 358/1.9 |
| 2005/0210253 A1* | 9/2005 | Shigeeda | ....................... | 713/171 |

(Continued)

FOREIGN PATENT DOCUMENTS

JP    2001-312377    11/2001

(Continued)

OTHER PUBLICATIONS

Korean Office Action dated Aug. 14, 2009 in corresponding Korean Patent Application No. 10-2007-7022593.

*Primary Examiner* — Michael S McNally
(74) *Attorney, Agent, or Firm* — Fitzpatrick, Cella, Harper & Scinto

(57) ABSTRACT

A printing apparatus is connected to a network which includes an information processing apparatus transmitting printing data and an authentication information issuance server issuing authentication information to the information processing apparatus. The printing apparatus includes a transmitting unit, a receiving unit, and a printing unit. The transmitting unit transmits, to the information processing apparatus, information showing the authentication information being required, the authentication information is required in order to perform printing based on the printing data transmitted from the information processing apparatus, and the authentication information is issued from the authentication information issuance server. The authentication information indicates permission issued from the authentication information issuance server. The receiving unit receives the authentication information issued from the authentication information issuance server and the printing data from the information processing apparatus. The printing unit performs a print job based on the printing data received by the receiving unit.

8 Claims, 7 Drawing Sheets

U.S. PATENT DOCUMENTS

2005/0237564 A1* 10/2005 Sugimoto ............... 358/1.15
2007/0044143 A1* 2/2007 Zhu et al. .................. 726/8

FOREIGN PATENT DOCUMENTS

| | | |
|---|---|---|
| JP | 2001-312387 | 11/2001 |
| JP | 2001-1312386 | 11/2001 |
| JP | 2004-110561 | 4/2004 |
| JP | 2004-362385 | 12/2004 |
| KR | 2003-0014224 | 2/2002 |
| KR | 2003-0010817 A | 2/2003 |
| WO | 0232047 A1 | 4/2002 |

* cited by examiner

PRINTING APPARATUS AND INFORMATION PROCESSING APPARATUS

TECHNICAL FIELD

The present invention relates to a printing apparatus, an information processing apparatus, a method for controlling a printing apparatus, a method for controlling an information processing apparatus, a computer program, and a recording medium. More particularly, the present invention relates to a technique applied to a printing apparatus connected to a network.

BACKGROUND ART

Japanese Patent Application Laid-Open No. 2003-316458 proposes a peripheral device management system that includes a client terminal that transmits a job, a peripheral device that receives and processes the job, and a server device that manages the peripheral device, which are connected with each other through a network. The server device issues a job ticket that is job issuance permission for the client terminal.

The job, transmitted from the client terminal, includes the issued job ticket as part of attribute information. The peripheral device interprets the job ticket included in the attribute information of the job and confirms the issuance permission by the server device for the job. When a printing apparatus that a user wants to use requires authentication information, such as the above-described job ticket or a later-described authentication ticket, issued by the server, an appropriate method is necessary to let the user know it. In addition, the user must know an address of the server to get authentication information from the server. From the foregoing, it would therefore be more advantageous if there was a method for easily obtaining information required when the user wants to use a network printing apparatus.

Furthermore, a printing apparatus may change, during its operation, operational conditions from the setting requiring no authentication ticket to the setting requiring an authentication ticket. In such a case, a print job requested by an information processing apparatus is cancelled unless the setting of the information processing apparatus is changed correspondingly. If a user of the information processing apparatus is not notified of the change of setting in the printing apparatus, the user will be confused when the print job is suddenly interrupted. From the foregoing, it would therefore also be more advantageous if there was a network printing system capable of simplifying settings required when a user uses the system.

DISCLOSURE OF THE INVENTION

The present invention is directed to a network printing system that requires authentication information for a print job performed in a printing apparatus. And more particularly, the present invention is directed to a network printing system that is capable of simplifying the setting required when a user (client terminal) uses the system.

A first exemplary embodiment of the present invention provides a printing apparatus connected to a network, in which the network includes an information processing apparatus transmitting printing data and an authentication information issuance server issuing authentication information to the information processing apparatus. The printing apparatus according to the first exemplary embodiment of the present invention includes a transmitting unit, a receiving unit, and a printing unit.

The transmitting unit transmits, to the information processing apparatus, information showing the authentication information being required, the authentication information is required in order to perform printing based on the printing data transmitted from the information processing apparatus, and the authentication information is issued from the authentication information issuance server. The authentication information indicates permission issued from the authentication information issuance server. The receiving unit receives the authentication information issued from the authentication information issuance server and the printing data from the information processing apparatus. The printing unit performs a print job based on the printing data received by the receiving unit.

A second exemplary embodiment of the present invention provides an information processing apparatus connected to a network, in which the network includes a printing apparatus executing a print job and an authentication information issuance server issuing authentication information necessary for the print job of the printing apparatus. The information processing apparatus according to the second exemplary embodiment of the present invention includes an information receiving unit, an authentication information acquiring unit, and a transmitting unit.

The information receiving unit receives address information of the authentication information issuance server from the printing apparatus. The authentication information acquiring unit accesses the authentication information issuance server based on the address information received from the information receiving unit and obtains authentication information. The transmitting unit transmits, to the printing apparatus, the authentication information obtained by the authentication information acquiring unit together with printing data.

A third exemplary embodiment of the present invention provides an information processing apparatus connected to a network, in which the network includes a printing apparatus executing a print job and an authentication information issuance server issuing authentication information necessary for the print job of the printing apparatus. The information processing apparatus according to the third exemplary embodiment of the present invention includes an information transmitting unit, an information receiving unit, an authentication information acquiring unit, and a transmitting unit.

The information transmitting unit transmits, to the network, retrieval information necessary to search the authentication information issuance server. The information receiving unit receives address information of the authentication information issuance server. The authentication information acquiring unit accesses the authentication information issuance server based on the address information received by the information receiving unit and obtains authentication information. The transmitting unit transmits, to the printing apparatus, the authentication information obtained by the authentication information acquiring unit together with printing data.

Other embodiments, features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EXEMPLARY EMBODIMENTS

Exemplary embodiments, features and aspects of the invention will be described in detail below with reference to the drawings.

First Exemplary Embodiment

Figure 1:
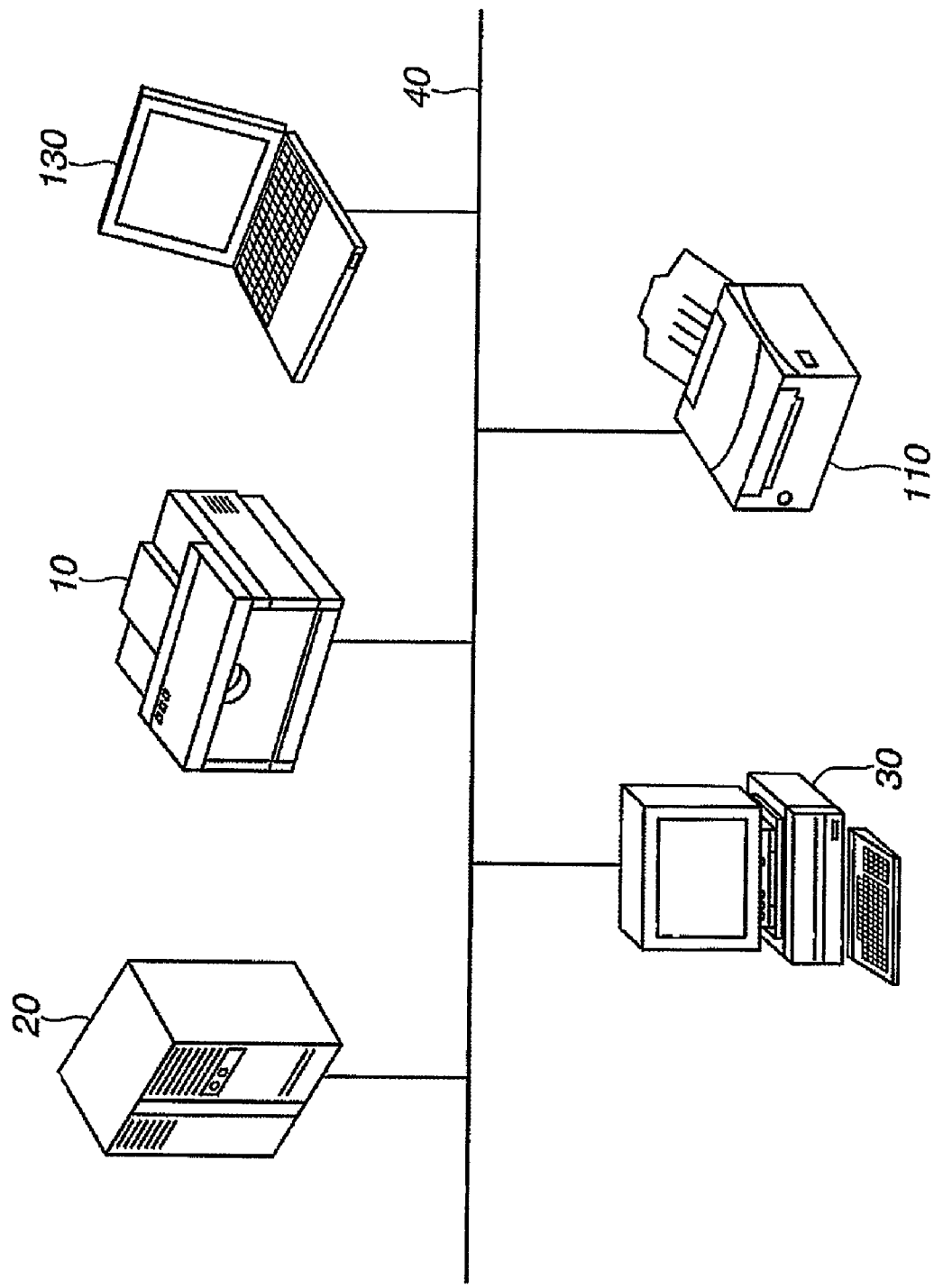
FIG. 1 is a diagram showing the overall configuration of an exemplary network printing system in accordance with a first exemplary embodiment of the present invention.

FIG. 1 is a diagram showing the overall configuration of a network printing system in accordance with an exemplary embodiment of the present invention. The network printing system of the exemplary embodiment includes a first printing apparatus 10, a second printing apparatus 110, an authentication ticket issuance server 20, a first client terminal 30, and a second client terminal 130 which are connected with each other via a network 40.

The authentication ticket issuance server 20 issues an authentication ticket required when the printing apparatus 10 or 110 is used. A user can operate the network printing system through the first client terminal 30 or the second client terminal 130.

Figure 2:
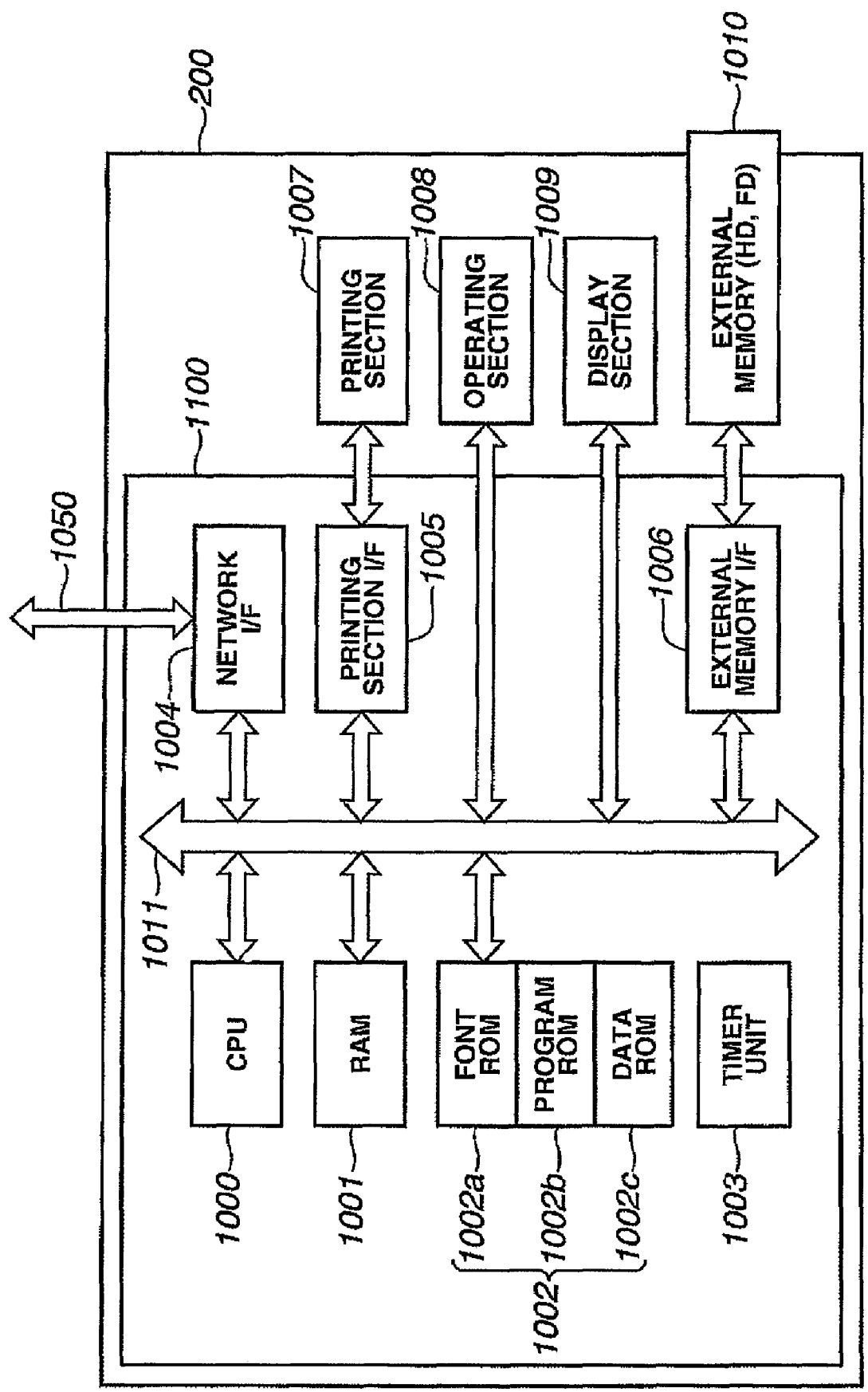
FIG. 2 is a block diagram showing an example of the architecture of a printing apparatus according to an aspect of the present invention.

FIG. 2 is a block diagram showing the internal arrangement of an exemplary printing apparatus 200 that constitutes the printing apparatus 10 and the second printing apparatus 110. The printing apparatus 200 includes CPU 1000 associated with RAM 1001 and ROM 1002. CPU 1000 is connected via a system bus 1011 to a printing section I/F 1005. The printing section I/F 1005 is connected to a printing section (i.e., a printer engine) 1007.

CPU 1000 produces an image signal (i.e., output information) based on control programs stored in a program ROM area 1002b of ROM 1002 as well as control programs stored in an external memory 1010. The image signal formed by CPU 1000 is sent via the printing section I/F 1005 to the printing section 1007.

In addition to the program ROM area 1002b that stores the control programs of CPU 1000, ROM 1002 further includes a font ROM area 1002a and a data ROM area 1002c. The font ROM area 1002a stores font data used when CPU 1000 produces the output information. The data ROM area 1002c stores various information and data that the client terminals 30 and 130 can use, when the printing apparatus is not equipped with the external memory 1010 such as a hard disk.

CPU 1000, which is connected via a network I/F 1004 to a network 1050, can communicate with any client apparatus (not shown) on the network. In other words, CPU 1000 can send the information and data of the printing apparatus to the client apparatus on the network. RAM 1001 is a main memory of CPU 1000 that can functionally provide a work area. Although not shown, an optional RAM can be added (for example, through an extension port) if expansion of memory capacity is necessary.

RAM 1001 can be used as an output information developing area, an environmental data storing area, and an NVRAM. A display section 1009 is equipped with a monitor that informs a printing service user of various information and data. An external memory I/F 1006 has a function of controlling the external memory 1010, such as a hard disk (HD) or an IC card, when the external memory 1010 accesses the CPU 1000 or the like.

The external memory 1010, connected as an optional device, stores font data, emulation programs, and form data. An operation panel 1008 is equipped with switches allowing a user to manipulate the system and an LED display unit through which various data and indications are displayed. The external memory 1010 is not limited, in total number, to one. Thus, it is possible to use an optional font card to supply additional font data. Furthermore, it is possible to provide a plurality of additional external memories storing a control language interpreting program when a printing apparatus is operated based on a different computer language.

Furthermore, although not shown in the drawings, an NVRAM (Non Volatile RAM) can be provided to store printing apparatus mode setting information entered from the operation panel 1008. A timer unit 1003 counts the time to check whether or not the validity of a certificate has expired. The timer unit 1003 can be omitted when ROM 1002 can function as a comparable timer, or when an external timer having the similar function is available for the printing apparatus. A module 1100 is a unit integrating main components of the printing apparatus 200.

Figure 3:
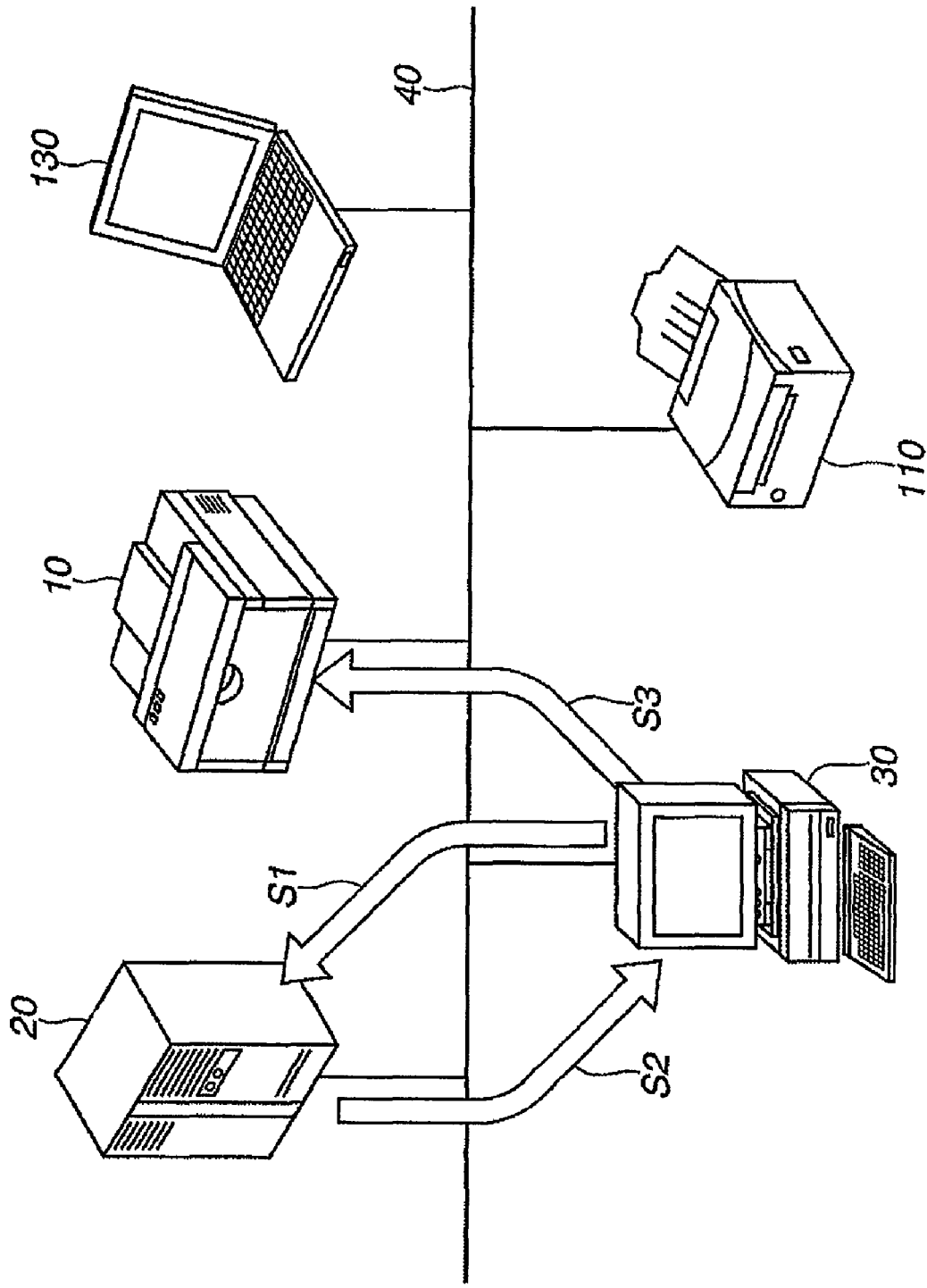
FIG. 3 is a diagram showing the flow of printing data requiring an authentication ticket, transmitted and received among a client terminal, an authentication ticket issuance server, and a printing apparatus in accordance with an aspect of the present invention.

FIG. 3 shows exemplary flow of data transmitted and received in an actual printing operation among the first printing apparatus 10, the authentication ticket issuance server 20, and the first client terminal 30. The authentication ticket issuance server 20 issues an authentication ticket required when the first printing apparatus 10 executes a print job. The first client terminal 30 stores a preinstalled printing client (i.e., printing software).

First, a user of the first client terminal 30 inputs a printing request to the client terminal 30. In response to the printing request, the first client terminal 30 requests the authentication ticket issuance server 20 to issue an authentication ticket that authorizes the first client terminal 30 to use the first printing apparatus 10 (refer to step S1). In response to the request for obtaining an authentication ticket, the authentication ticket issuance server 20 determines whether or not an authentication ticket can be issued to an authentication ticket requester.

When an authentication ticket can be issued, the authentication ticket issuance server 20 sends an authentication ticket to the first client terminal 30, i.e., to the authentication ticket requester (refer to step S2).

The first client terminal 30, when it receives an authentication ticket, transmits the obtained authentication ticket together with printing data to the first printing apparatus 10

(refer to step S3). The first printing apparatus 10, when it receives the printing data, verifies the authentication ticket sent together with the printing data. The first printing apparatus 10 outputs the printing data only when no problem is found with respect to the received authentication ticket.

Figure 4:
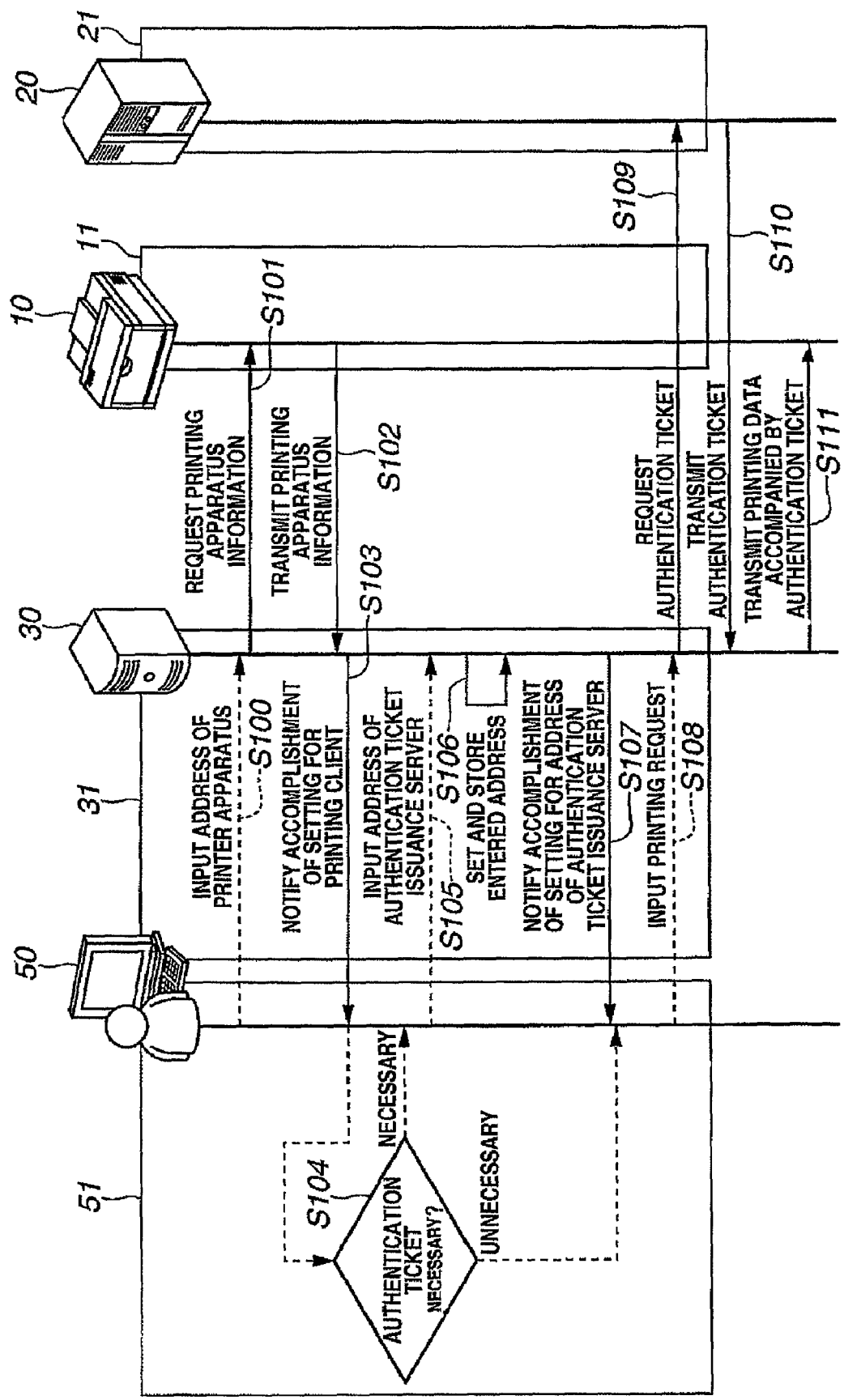
FIG. 4 is a diagram showing an example of a setting sequence for a printer client that is required to obtain an authentication ticket, according to an aspect of the present invention.

FIG. 4 shows an example of a setting sequence for a client terminal in a network printing system using a printing apparatus requiring an authentication ticket. In particular, FIG. 4 shows a user 50, the client terminal 30, and the printing apparatus 10. The client terminal 30 represents not only the first client terminal 30 but also the second client terminal 130. The printing apparatus 10 represents not only the first printing apparatus 10 but also the second printing apparatus 110. The user 50 uses the client terminal 30 when a print job is necessary. The line 51 indicates the action of user 50. The line 31 indicates the action of client terminal 30. The line 11 indicates the action of printing apparatus 10. And, the line 21 indicates the action of authentication ticket issuance server 20.

The user 50 sends, to the client terminal 30, address information of the printing apparatus 10 that the user 50 wants to use (refer to step S100). The client terminal 30, when any address information is input from the user 50, communicates with the printing apparatus 10 corresponding to the entered address and transmits a request for obtaining printing apparatus information (refer to step S101).

In response to the request for obtaining the printing apparatus information sent from the client terminal 30, the printing apparatus 10 transmits to the client terminal 30 the printing apparatus information that includes the state of printing apparatus 10 and the equipment (configuration) of printing apparatus 10 (refer to step S102). The client terminal 30 then sets and stores the printing apparatus information sent from the printing apparatus 10 and notifies the user 50 of accomplishment of all setting necessary for the client terminal (refer to step S103).

Next, the user 50 determines, by using an appropriate method, whether or not an authentication ticket is necessary when the user 50 uses the printing apparatus 10 (refer to step S104). When the judgment result indicates that any authentication ticket is necessary, the user 50 asks an administrator to tell address information of the authentication ticket issuance server 20. On the other hand, when no authentication ticket is required, the user 50 can freely use the first printing apparatus 10. Thus, the process of setting the client terminal 30 is finished at this moment (refer to step S104). When the judgment result of step S104 indicates that an authentication ticket is necessary to use the printing apparatus 10, the user 50 inputs an address of the authentication ticket issuance server 20 to the client terminal 30 (refer to step S105).

The client terminal 30, when it receives the address of authentication ticket issuance server 20 input by the user 50, sets and stores the entered address of the authentication ticket issuance server 20 (refer to step S106). When the setting of address is accomplished, the client terminal 30 notifies the user 50 of accomplishment of all necessary setting (refer to step S107). Subsequently, the client terminal 30 obtains an authentication ticket from the authentication ticket issuance server 20 before executing the processing requiring an authentication ticket on the printing apparatus 10.

Then, in response to a printing request input by the user 50 (refer to step S108), the client terminal 30 requests the authentication ticket issuance server 20 corresponding to the address being set in the step S106 to give authentication information corresponding to the user 50 (refer to step S109). The authentication ticket issuance server 20 transmits, in response to the request, the authentication information corresponding to the user 50 to the client terminal 30 (refer to step S110). The client terminal 30 receives the authentication ticket transmitted from the authentication ticket issuance server 20.

The client terminal 30 transmits printing data accompanied by the received authentication ticket to the printing apparatus 10 (refer to step S111). The printing apparatus 10 receives the printing data accompanied by an authentication ticket and confirms properness of the accompanied authentication ticket. The printing apparatus 10 executes a print job based on the printing data when the authentication ticket is proper.

Regarding the method for transmitting the authentication ticket and the printing data to the printing apparatus 10, (1) it is possible to add the authentication ticket to the printing data and transmit the printing data accompanied by an authentication ticket to the printing apparatus 10, or (2) it is possible to separately transmit the printing data and the authentication ticket to the printing apparatus 10 if the printing apparatus 10 can discriminate them and judge the relationship between them.

The above procedure is a fundamental setting sequence typically required in executing a print job in a network printing system. As understood from the above description, there are some items to be set in the client terminal 30 before using the printing apparatus 10 (or 110) connected in the network. The setting of such items requires information to be checked. Thus, the user 50 is forced to do troublesome operations. However, the present invention provides a network printing system that can use the printing apparatus 10 without troublesome operations.

Figure 5:
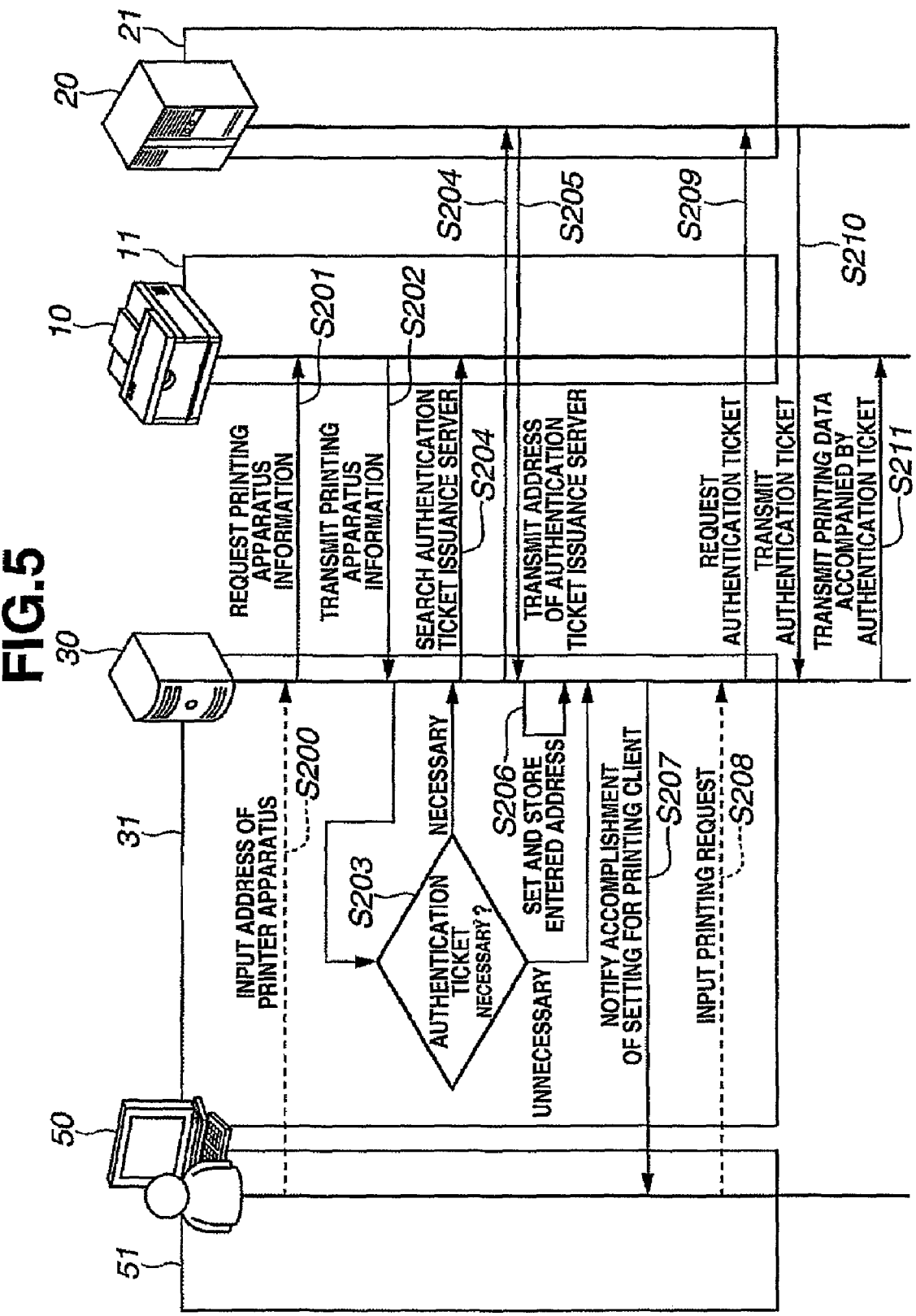
FIG. 5 is a diagram showing a first example of a setting sequence for a printer client that is required to obtain an authentication ticket in accordance with the first exemplary embodiment of the present invention.

FIG. 5 is a diagram in accordance with the first exemplary embodiment of the present invention, which shows one example of a setting sequence for a client terminal in a network printing system using a printing apparatus requiring an authentication ticket. In FIG. 5, the components identical with or similar to those disclosed in the network printing system shown in FIG. 4 are denoted by the same reference numerals.

The user 50 sends, to the client terminal 30, address information of the printing apparatus 10 that the user 50 wants to use (refer to step S200). The client terminal 30, when the address information of the printing apparatus 10 is input by the user 50, communicates with the printing apparatus 10 corresponding to the entered address and transmits a request for obtaining printing apparatus information (refer to step S201).

In response to the request for obtaining the printing apparatus information sent from the client terminal 30, the printing apparatus 10 transmits to the client terminal 30 the printing apparatus information that includes the state of printing apparatus 10 and the equipment of printing apparatus 10.

In this case, if an authentication ticket is required to use the printing apparatus 10, the printing apparatus 10 also transmits information notifying the necessity of acquiring an authentication ticket to the client terminal 30 (refer to step S202).

The client terminal 30 checks, based on the information obtained from the printing apparatus 10, whether or not an authentication ticket is necessary to use the printing apparatus 10 (refer to step S203). When the check result indicates that an authentication ticket is required, the client terminal 30 initiates the processing for setting address information of an authentication ticket issuance server. When no authentication ticket is required, the client terminal 30 finishes the setting for the client terminal 30.

When the check result of step S203 indicates that an authentication ticket is necessary to use the printing apparatus 10, the client terminal 30 transmits a retrieval packet to the network (i.e., the first printing apparatus 10 and the authentication ticket issuance server 20). The retrieval packet is for searching the address of the authentication ticket issuance server 20 (refer to step S204). A practical searching method is, for example, based on a broadcast or multicast packet transmission technique. The service retrieval protocol, such as SLP, UPnP, or WSD, can be also used for the search.

The authentication ticket issuance server 20, in response to the retrieval packet for searching the authentication ticket issuance server, issues a print permission ticket (i.e., permission for carrying out a print job). Then, the authentication ticket issuance server 20 sends the print permission ticket and the address information to the client terminal 30, i.e., to a transmitter of the retrieval packet (refer to step S205).

The client terminal 30 receives the address information from the authentication ticket issuance server 20 and stores the received address information (refer to step S206). After finishing the setting of address information, the client terminal 30 notifies the user 50 of accomplishment of all setting necessary to use the printing apparatus 10 (refer to step S207). If the client terminal 30 receives a printing request entered by the user 50 (refer to step S208), the client terminal 30 requests the authentication ticket issuance server 20 corresponding to the address information having been set in the step S206 to give authentication information corresponding to the user 50 (refer to step S209).

In response to the request, the authentication ticket issuance server 20 transmits the authentication information corresponding to the user 50 to the client terminal 30 (refer to step S210). The client terminal 30 receives the authentication ticket sent from the authentication ticket issuance server 20. Then, the client terminal 30 transmits the printing data accompanied by the received authentication ticket to the printing apparatus 10 (refer to step S211). The printing apparatus 10 receives the printing data accompanied by an authentication ticket and confirms properness of the accompanied authentication ticket. The printing apparatus 10 executes a print job based on the printing data when the authentication ticket is proper.

As described above, the network printing system according to the first exemplary embodiment requires the user 50 to set only one item relating to the address information of the printing apparatus 10. Thus, a network print job using a printing apparatus that requires an authentication ticket is feasible without requiring any setting relating to the authentication ticket issuance server 20.

Second Exemplary Embodiment

Figure 6:
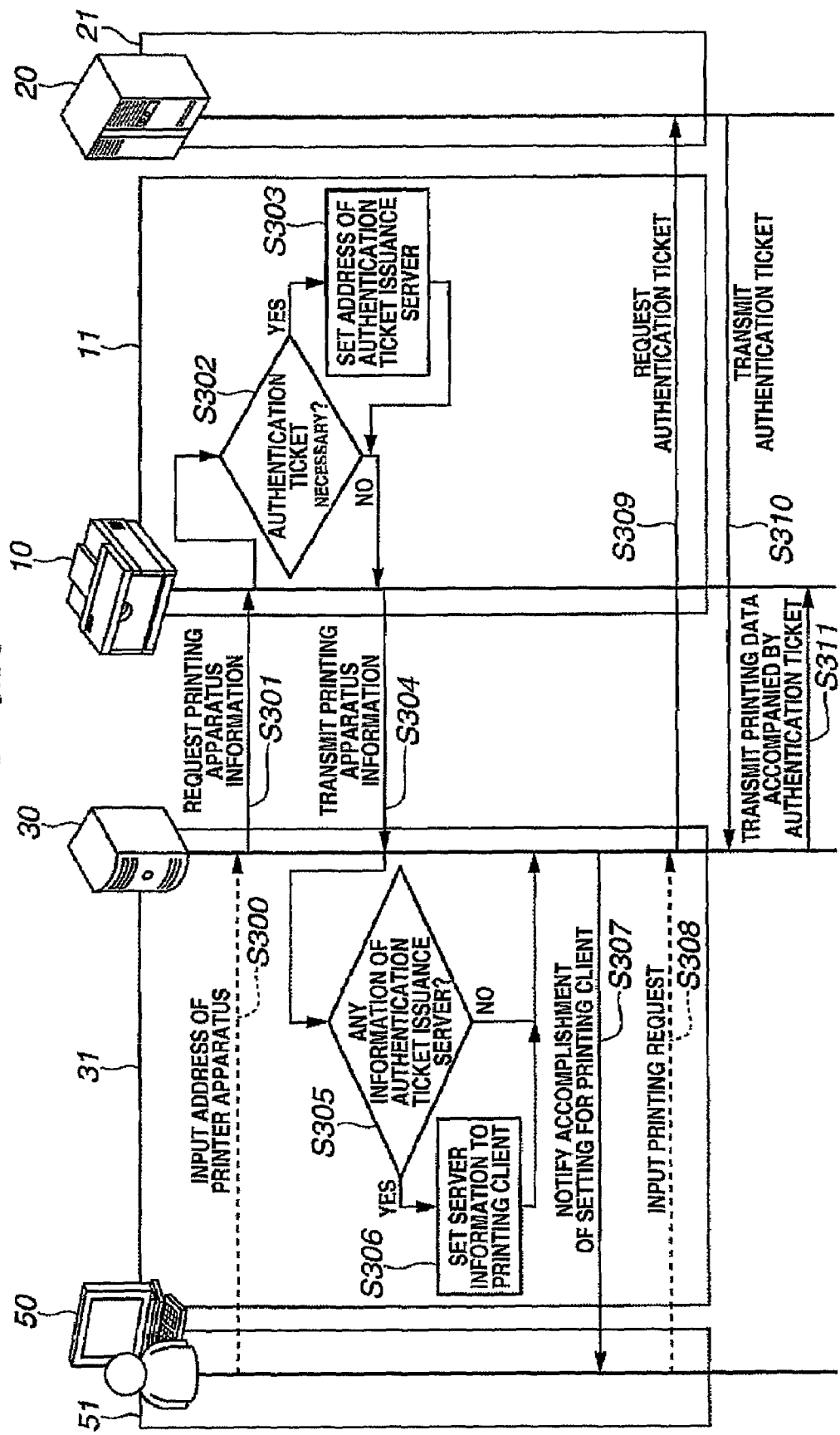
FIG. 6 is a diagram showing a second example of the setting sequence for a printer client that is required to obtain an authentication ticket in accordance with a second exemplary embodiment of the present invention.

FIG. 6 is a diagram in accordance with a second exemplary embodiment of the present invention, which shows another example of a setting sequence for a client terminal in a network printing system using a printing apparatus requiring an authentication ticket. In FIG. 6, the components identical with or similar to those disclosed in the network printing system shown in FIG. 4 are denoted by the same reference numerals. Moreover, features of the second embodiment which are similar to that of the first embodiment are not discussed again.

The user 50 sends, to the client terminal 30, address information of the printing apparatus 10 that the user 50 wants to use (refer to step S300). The client terminal 30, when any address information is input by the user 50, communicates with the printing apparatus 10 corresponding to the entered address and transmits a request for obtaining printing apparatus information (refer to step S301).

In response to the request for obtaining the printing apparatus information sent from the client terminal 30, the printing apparatus 10 checks whether or not an authentication ticket is necessary to use the printing apparatus 10 (refer to step S302). When the check result indicates that an authentication ticket is required, the printing apparatus 10 sets the address information of the authentication ticket issuance server 20 being set beforehand in the printing apparatus 10 to the printing apparatus information matching with the client terminal 30 (refer to step S303).

In the present exemplary embodiment, the printing apparatus information includes the state of printing apparatus 10 and the equipment of the printing apparatus 10. When the address information of the authentication ticket issuance server 20 is set in the step S303, the printing apparatus 10 transmits the address information to the client terminal 30 (refer to step S304).

The client terminal 30 receives the printing apparatus information from the printing apparatus 10 and checks whether or not any information relating to the authentication ticket issuance server 20 is present in the printing apparatus information (refer to step S305). When the check result indicates that no information is present with respect to the authentication ticket issuance server 20, the client terminal 30 finishes the setting for the printing apparatus.

On the other hand, when any information relating to the authentication ticket issuance server 20 is present, the client terminal 30 initiates the processing for setting address information of the authentication ticket issuance server 20 (refer to step S306). In step S306, the client terminal 30 sets and stores the address of the authentication ticket issuance server 20. After finishing the setting of address information, or when the check result of step S305 indicates that there is no information relating to the authentication ticket issuance server 20, the client terminal 30 notifies the user 50 of accomplishment of all setting necessary to use the network printing system (refer to step S307).

When the user 50 inputs a printing request (refer to step S308), the client terminal 30 requests the authentication ticket issuance server 20 corresponding to the address being set in the step S306 to give authentication information corresponding to the user 50 (refer to step S309). The authentication ticket issuance server 20 transmits, in response to the request, the authentication information corresponding to the user 50 to the client terminal 30 (refer to step S310). The client terminal 30 receives the authentication ticket transmitted from the authentication ticket issuance server 20.

Then, the client terminal 30 transmits the printing data accompanied by the received authentication ticket to the printing apparatus 10 (refer to step S311). The printing apparatus 10 receives the printing data accompanied by an authentication ticket and confirms properness of the accompanied authentication ticket. The printing apparatus 10 executes a print job based on the printing data when the authentication ticket is proper.

As described above, the network printing system according to the second exemplary embodiment requires the user 50 to set only one item relating to the address information of the printing apparatus 10. Thus, a network print job using a printing apparatus that requires an authentication ticket is feasible without requiring any setting relating to the authentication ticket issuance server 20.

Third Exemplary Embodiment

Figure 7:
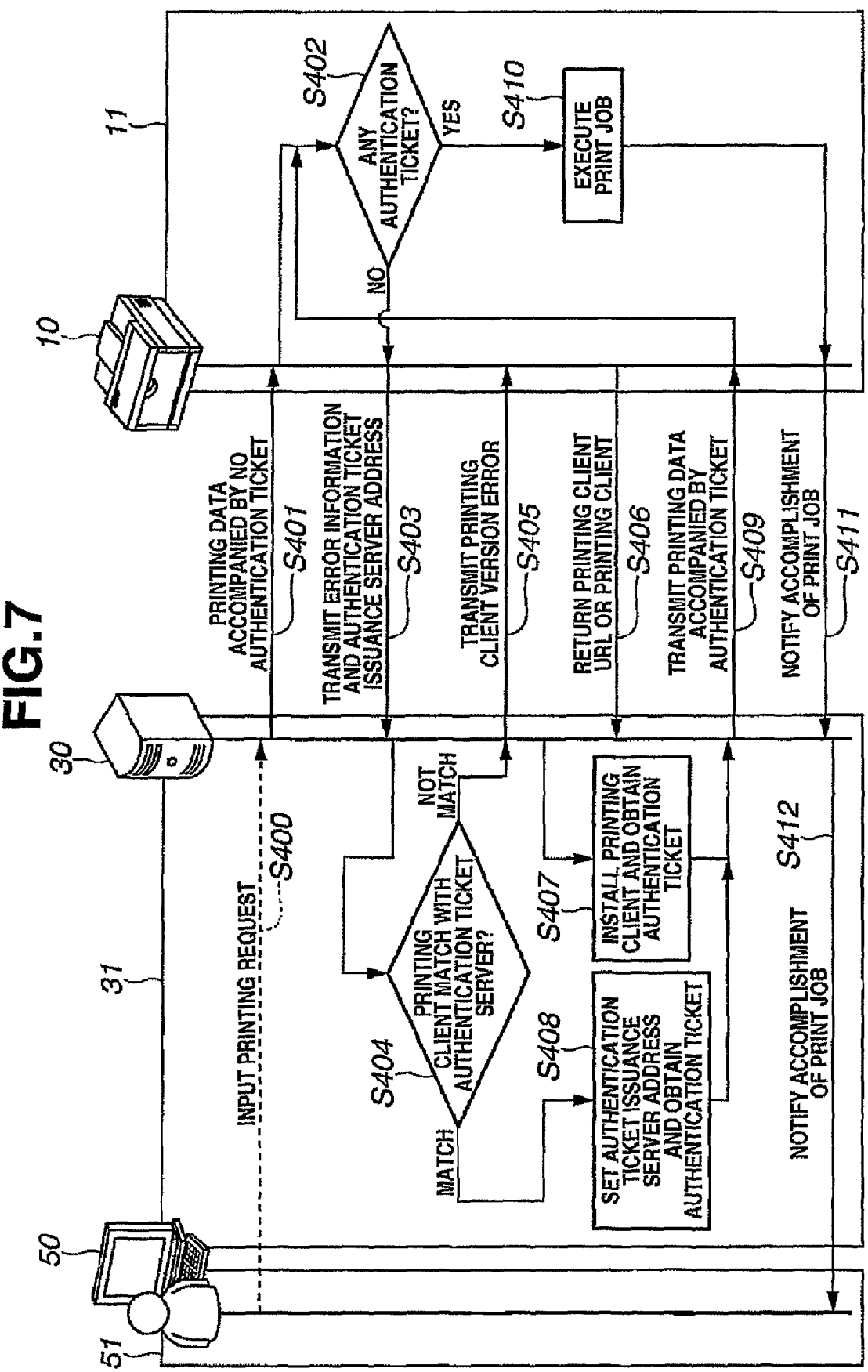
FIG. 7 is a diagram showing a third example of the setting sequence for a printer client that is required to obtain an authentication ticket in accordance with a third exemplary embodiment of the present invention.

FIG. 7 is a diagram in accordance with a third exemplary embodiment of the present invention, which shows another example of a setting sequence for a client terminal in a network printing system using a printing apparatus requiring an authentication ticket. In particular, FIG. 7 shows the action of a printing apparatus initially requiring no authentication ticket and the action of the client terminal, in which the printing apparatus changes its setting to require an authentication ticket during an operation. In FIG. 7, the components identical with or similar to those disclosed in the network printing system shown in FIG. 4 are denoted by the same reference numerals. Moreover, features of the third embodiment which are similar to that of the first embodiment are not discussed again.

First, the user 50 sends a printing request to the client terminal 30 when the user 50 wants to use the printing apparatus 10 (refer to step S400). At this moment, the client terminal 30 is not yet notified of a change of setting having occurred in the printing apparatus 10 that now requires an authentication ticket. Thus, without acquiring an authentication ticket, the client terminal 30 transmits printing data to the printing apparatus 10 (refer to step S401).

The printing apparatus 10 checks whether or not there is any authentication ticket attached to the printing data received from the client terminal 30 (refer to step S402). When the check result indicates the presence of an authentication ticket, the printing apparatus 10 executes a print job requested by the user 50 (refer to step S410).

On the other hand, when the check result of step S402 indicates that there is no authentication ticket, the printing apparatus 10 transmits error information to the client terminal 30 (refer to step S403). The information transmitted to the client terminal 30 in the step S403 includes error information notifying no presence of any authentication ticket and address information of the authentication ticket issuance server 20. The client terminal 30 receives the error information with respect to the authentication ticket from the printing apparatus 10 and notifies the user 50 of the error information. Then, the client terminal 30 checks whether or not printing software used in the client terminal 30 (hereinafter, referred to as "printing client software") matches with an authentication ticket (refer to step S404).

When the check result indicates that the printing client software cannot handle an authentication ticket, the client terminal 30 transmits version error information to the printing apparatus 10 (refer to step S405). The version error information shows the fact that a present version of the printing client software cannot handle an authentication ticket. The first printing apparatus 10 receives the version error information sent from the client terminal 30 and returns, to the client terminal 30, printing client software itself corresponding to an authentication ticket that the first printing apparatus 10 holds beforehand or information (e.g., URL) indicating a place where the printing client software exists (refer to step S406).

It is noted that in the third exemplary embodiment, the information transmitted from the first printing apparatus 10 to the client terminal 30 includes the procedure necessary to use the software or information relating to the URL of a website that provides a document describing the procedure.

The client terminal 30 receives, from the first printing apparatus 10, the printing client software corresponding to the authentication ticket or the information indicating the place where the printing client software exists. Based on the received information, the client terminal 30 installs in its memory (e.g., a hard disk) the printing client software corresponding to the authentication ticket.

Then, the client terminal 30 obtains an authentication ticket from the authentication ticket issuance server 20 whose address has been received in the processing of the step S403 (refer to step S407). Then, the client terminal 30 executes the installed printing client software to transmit the printing data accompanied by the acquired authentication ticket to the printing apparatus 10 (refer to step S409).

The first printing apparatus 10 receives the printing data accompanied by the authentication ticket transmitted from the client terminal 30. Then, the first printing apparatus 10 executes the checking process described in the step S402. When an authentication ticket is present, the sequence proceeds to the step S410 in which the printing apparatus 10 executes a print job requested by the client terminal 30.

After finishing the print job of step S410, the printing apparatus 10 notifies the client terminal 30 (i.e., a transmitter of the printing data) of normal accomplishment of the job (refer to step S411). When the client terminal 30 receives a notification of the normally accomplished print job from the printing apparatus 10, the client terminal 30 notifies the user 50 of accomplishment of the print job (refer to step S412).

On the other hand, when the check result of step S404 indicates that the client terminal 30 matches with the authentication ticket issuance server 20, the client terminal 30 proceeds to step S408 to set and store the address of the authentication ticket issuance server received in the step S403 and access the address to obtain an authentication ticket. Then, the client terminal 30 adds the obtained authentication ticket to the printing data. Subsequently, as described in the step S409, the client terminal 30 transmits again the printing data to the printing apparatus 10.

As described above, the network printing system of the third exemplary embodiment can flexibly install printing client software corresponding to an authentication ticket during the operation of a printing apparatus. Thus, the network printing system of the third exemplary embodiment can be preferably applied to any printing apparatus that may change, during an operation, its operational conditions from the setting requiring no authentication ticket to the setting requiring an authentication ticket. In other words, the client terminal can flexibly establish its environmental conditions so as to match with an authentication ticket.

Other Exemplary Embodiments, Features and Aspects of the Present Invention

In the above-described exemplary embodiments of the present invention, the method for simplifying the setting required when the network printing system is used can be realized by running a program stored in RAM or ROM of a computer. Thus, the present invention encompasses the program itself and a recording medium that stores the program(s) for a computer.

Furthermore, the present invention can be embodied as a system, an apparatus, a method, a program, or a recording medium. For example, the present invention can be applied to a system composed of a plurality of devices, or can be applied to a single device.

The present invention can be realized by supplying software programs that realize the functions or processes explained in the above-described exemplary embodiments (i.e., the programs corresponding to the flowcharts shown in FIGS. 5, 6 and 7) to a system or to an apparatus. Not only directly supplying such programs to the system (or apparatus) but also supplying them from a remote place is possible. A computer in the system (or apparatus) can read program codes being supplied and execute the programs.

Accordingly, when the functions or processes of the present invention are realized by a computer, program codes installed on the computer are means for realizing the present invention. In other words, the present invention encompasses the computer programs that can realize the functions or processes of the present invention. In this case, equivalents of programs can be used if they possess comparable functions. For example, the program(s) may take the form of object codes, interpreter programs, or OS script data.

The recording medium supplying the program can be any one of floppy (registered trademark) disk, hard disk, optical disk, magneto-optical disk, MO, CD-ROM, CD-R, CD-RW, magnetic tape, nonvolatile memory card, ROM, and DVD (DVD-ROM, DVD-R) or the like.

The method for supplying the program(s) includes accessing a home page on the internet using browsing software of a client computer, when the home page allows each user to download the computer programs of the present invention, or compressed files having automatic installing functions, to a hard disk or other recording medium of the user.

Furthermore, the program codes constituting the programs of the present invention can be divided into a plurality of files so that respective files are downloadable from different home pages. Namely, the present invention can be applied to WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the internet. The users can decipher the programs using the key information and can install the programs on their computers.

When the computer reads and executes the installed programs, the functions or processes of the above-described exemplary embodiments can be realized. Furthermore, based on an instruction of the program, the operating system of the computer may execute part or all of the processing so that the functions or processes of the above-described exemplary embodiments can be realized.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions or processes of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-057934 filed Mar. 2, 2005, which is hereby incorporated by reference herein in its entirety.

The invention claimed is:

1. A printing apparatus which is connected to a network to which an information processing apparatus configured to transmit printing data and an authentication information issuance server configured to issue authentication information to the information processing apparatus transmitting the printing data are connected, the printing apparatus comprising:

a printing apparatus information output unit configured to output, in a case where setting of the printing apparatus has been changed to setting which requires the authentication information issued by the authentication information issuance server to perform a printing process based on the printing data transmitted by the information processing apparatus, printing apparatus information which includes information indicating that the authentication information is required and an address of the authentication information issuance server to the information processing apparatus;

a receiving unit configured to receive the printing data to which the authentication information has been added; and a printing unit configured to perform the printing process based on the printing data received by the receiving unit, wherein the printing apparatus information output unit transmits information indicating a location where software corresponding to the authentication information issued by the authentication information issuance server exists or the software itself, when version error information is received from the information processing apparatus.

2. The printing apparatus according to claim 1, wherein the printing apparatus information output unit outputs authentication error information to the information processing apparatus when the printing data which is not accompanied by the authentication information issued by the authentication information issuance server is received from the information processing apparatus.

3. The printing apparatus according to claim 1, wherein the printing apparatus information output unit transmits the software corresponding to the authentication information to the information processing apparatus, when the printing data which is not accompanied by the authentication information issued by the authentication information issuance server is received from the information processing apparatus.

4. The printing apparatus according to claim 3, wherein the printing apparatus information output unit transmits information of a procedure necessary to use the printing apparatus or a URL of a document describing the procedure to the information processing apparatus.

5. The printing apparatus according to claim 1, wherein the printing apparatus information output unit transmits the software corresponding to the authentication information to the information processing apparatus, when the printing data which is not accompanied by authentication information issued by the authentication information issuance server is received from the information processing apparatus and when determination that the information processing apparatus does not correspond to the authentication information is received from the information processing apparatus.

6. The printing apparatus according to claim 1, wherein the printing apparatus information output unit notifies the information processing apparatus of a state of the printing apparatus currently using the authentication information issuance server, when the printing data which is not accompanied by the authentication information is received from the information processing apparatus.

7. A method for controlling a printing apparatus which is connected to a network to which an information processing apparatus configured to transmit printing data and an authentication information issuance server configured to issue authentication information to the information processing apparatus transmitting the printing data are connected, the method comprising:

outputting, in a case where setting of the printing apparatus has been changed to setting which requires the authentication information issued by the authentication information issuance server to perform a printing process based on the printing data transmitted by the information processing apparatus, printing apparatus information which includes information indicating that the authentication information is required and an address of the authentication information issuance server to the information processing apparatus;

receiving the authentication information issued from the authentication information issuance server and the printing data from the information processing apparatus to which the authentication information has been added; and performing the printing process based on the received printing data, wherein the printing apparatus information output unit transmits information indicating a location where software corresponding to the authentication information issued by the authentication information issuance server exists or the software itself, when version error information is received from the information processing apparatus.

8. A non-transitory computer-readable recording medium storing a program for a computer that controls a printing apparatus which is connected to a network to which an information processing apparatus configured to transmit printing data and an authentication information issuance server configured to issue authentication information to the information processing apparatus transmitting the printing data are connected, the program comprising:

computer-executable instructions for outputting, in a case where setting of the printing apparatus has been changed to setting which requires the authentication information issued by the authentication information issuance server to perform a printing process based on the printing data transmitted by the information processing apparatus, printing apparatus information which includes information indicating that the authentication information is required and an address of the authentication information issuance server to the information processing apparatus;

computer-executable instructions for receiving the authentication information issued from the authentication information issuance server and the printing data from the information processing apparatus to which the authentication information has been added; and computer-executable instructions for performing the printing process based on the received printing data, computer-executable instructions for transmitting information indicating a location where software corresponding to the authentication information issued by the authentication information issuance server exists or the software itself, when version error information is received from the information processing apparatus.

\* \* \* \* \*